United States Patent [19]

DeJager

[11] Patent Number: 5,661,781
[45] Date of Patent: Aug. 26, 1997

[54] MESSAGE NOTIFICATION SYSTEM FOR CARD USERS

[75] Inventor: Dale Scott DeJager, Lincroft, N.J.

[73] Assignee: AT&T

[21] Appl. No.: 431,607

[22] Filed: May 1, 1995

[51] Int. Cl.[6] .............................. H04M 1/64; H04M 3/54
[52] U.S. Cl. ........................... 379/67; 379/114; 379/144; 379/201
[58] Field of Search .............................. 379/144, 114, 379/67, 88, 89, 357, 201

[56] References Cited

U.S. PATENT DOCUMENTS 5,243,645  9/1993  Bissel et al. .................... 379/91
5,487,107  1/1996  Ackins et al. ................... 379/144

Primary Examiner—Fan Tsang
Attorney, Agent, or Firm—Jean Robert Miroille

[57] ABSTRACT

Messaging service subscribers are automatically notified of newly arrived messages in their mailboxes when they initiate a transaction, such as a calling card (or credit card) call, or a withdrawal at an Automated Teller Machine (ATM). The mail arrival notification message is delivered to the subscriber as part of the validation process for the credit/debit or calling card number.

26 Claims, 4 Drawing Sheets

| CARD ISSUER PREFIX | VALIDATION DATABASE ADDRESS |
|---|---|
| 9082<br>∘<br>∘<br>∘<br>9089 | njnet! db1 |
| 4128 | nynet! valdb |
| 4784 | attcom! carddb |
| 370000<br>∘<br>∘<br>∘<br>379999 | amexnet! cdbase |
| 572622 | atmnet! cashdbas |

| CARD NUMBER | RESTRICTIONS | MESSAGING ALERT | OTHER FIELDS |
|---|---|---|---|
| 301 | 302 | 303 | 304 |

| CARD NUMBER | VALIDATION DATABASE ADDRESS |
|---|---|
| 908 778 1234 | njnet! db1 |
| 412 855 6789 | nynet! valdb |
| 4784 012 9832 5546 | attcom! carddb |
| 3782 023456 78901 | amexnet! cdbase |
| 572 622 08 0987654321 | atmnet! cashdbas |

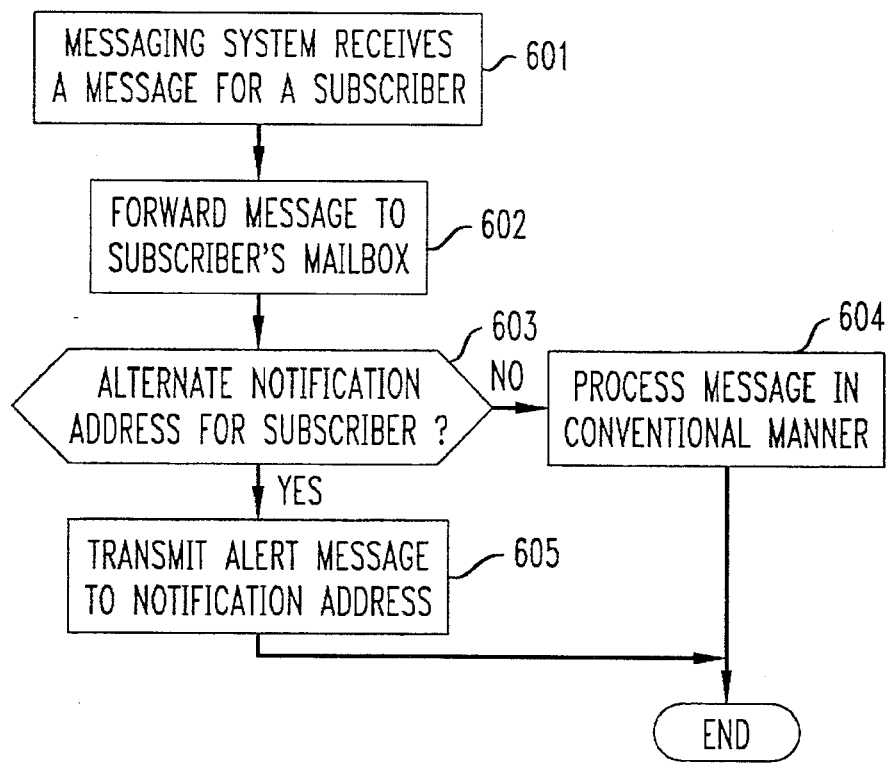

MESSAGE NOTIFICATION SYSTEM FOR CARD USERS

TECHNICAL FIELD

This invention relates to communications systems and more particularly to a method and a system for providing credit/debit and calling card users with information regarding messages in their electronic mailbox.

BACKGROUND OF THE INVENTION

Messaging service subscribers are generally alerted to new messages in their mailboxes by various types of sensory indicators. In voice mail systems, for example, a subscriber may receive such alert messages via a visual indicator, such as a lit waiting lamp indicator on a telephone set associated with the subscriber's messaging address. Alternatively, the alert message may be an audible indicator, such as a stutter dial tone that is applied to a subscriber's telephone set when the handset of that telephone is off-hook. For electronic mail systems, alert or notification messages of new mail arrival are typically displayed on a subscriber's monitor when the subscriber is logged on to a host connected to the electronic mail system.

One of the drawbacks of those alerting mechanisms is that they notify messaging service subscribers of incoming messages only when the subscribers are accessible at their messaging address. Those alerting mechanisms are clearly ineffective for highly mobile subscribers who are often compelled to place calls to their messaging system for the sole purpose of inquiring about new messages that may be waiting in their mailbox. When no new message is waiting in a subscriber's mailbox, an inquiry call to the messaging system is a waste of time and money.

In an effort to find a solution to this problem, messaging systems planners have designed a notification feature that allows a subscriber to define a so-called "mobile mailbox" for a messaging system that automatically dials out a subscriber's personal pager (beeper) number upon receiving a new message at the subscriber's "fixed" messaging address. Typically, the messaging system delivers to the pager a short message indicative of the header or content of the new message in the subscriber's mailbox. This solution is rather expensive especially when one considers that its implementation requires the use of a paging communications system with national and/or international coverage for highly mobile users. Equally, if not more, expensive are solutions that use either cellular communications networks or intelligent networks to dial personal telephone numbers, such as 500- or 700-prefix telephone numbers, for example, to place calls to messaging service subscribers in order to notify those subscribers of newly arrived messages in their mailboxes. Thus, a problem of the prior art is lack of an affordable alerting mechanism to notify messaging system users of newly arrived message(s) in their mailbox.

SUMMARY OF THE INVENTION

I have realized that highly mobile subscribers of messaging services frequently use public communications networks when traveling to call family members, co-workers, customers and suppliers. Typically, those calls are charged to calling card or commercial credit card numbers (hereinafter called "card numbers") which uniquely identify each messaging service subscriber. I have further realized that those highly mobile subscribers regularly charge expenses associated with commercial transactions to their debit or credit card.

The present invention is directed to a method and a system that automatically notify messaging service subscribers of presence or absence of messages in their mailboxes when their commercial credit/debit card or calling card numbers are validated, as part of the process of charging the expenses associated with a transaction to those card numbers.

In an embodiment of the principles of the invention, a messaging system is arranged to send to a card issuer's validation database alerting information indicative of the arrival of new message(s) in the mailbox of a messaging system subscriber who owns (or holds) a credit/debit card provided by the card issuer. The validation database stores the alerting information in a field of a profile that is associated with the card number of the subscriber. The aforementioned field may be, for example, a flag designed to store either a "Y" or "N" alphabetic character indicative of presence or absence, respectively, of a new message in the subscriber's mailbox. Alternatively, the field in the profile may be a counter indicative of the number of newly arrived messages waiting in a subscriber's mailbox.

In accordance with the principles of the invention, when the messaging system receives a new message destined for the messaging address of a particular subscriber, the messaging system, through a table look-up operation, matches the subscriber's messaging address to a credit/debit or calling card number. Thereafter, the messaging system identifies the card issuer for the card number as well as the address of a validation database of that card issuer. The messaging system then sends to the card issuer's validation database an alerting signal which includes the card number and data indicative of the arrival of the new message at the subscriber's mailbox. Upon receiving that signal, the validation database updates the profile for that card number by setting the flag in that profile to "Y", or by incrementing the counter by one. Thus, when the messaging service subscriber initiates a transaction, such as a credit card or calling card call, for example, the validation database, after validating the calling or credit card number, instructs the communications network completing the call to notify the caller of the newly arrived message in his or her mailbox before completing the call. The notification message may be included in an announcement, such as an audible logo identifying the carrier completing the call. An illustrative such announcement may be "Thank you for using AT&T, by the way you have one new message in your mailbox". Similarly, when the messaging service subscriber uses a debit card for a cash withdrawal at an Automated Teller Machine (ATM), for example, the validation database of the debit card issuer delivers a mail arrival message to the subscriber after validating the debit card number.

BRIEF DESCRIPTION OF THE DRAWINGS

In the drawings:

FIG. 5 illustrates a table that correlates a messaging address to a card number;

FIG. 6 illustrates instructions executed by the messaging system of FIG. 1 to generate and transmit messaging alert information to a database of a card issuer;

FIG. 7 is an illustrative message transmitted by the messaging system of FIG. 1 to a database of a card issuer.

DETAILED DESCRIPTION

Figure 1:
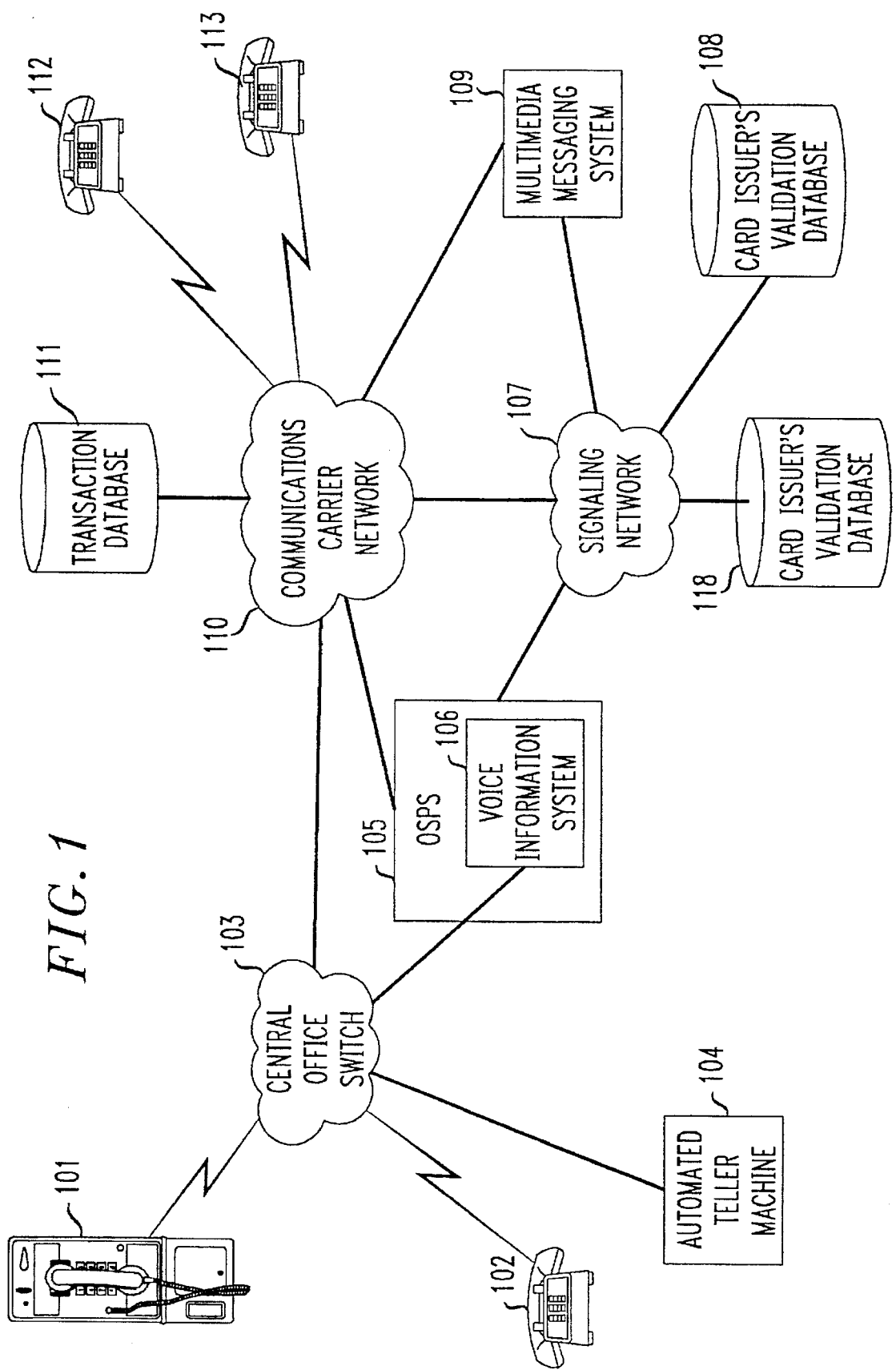
FIG. 1 shows in block diagram format a communications switching system arranged in accordance with the invention to notify calling card users of messages waiting in their mailbox.

FIG. 1 is a communication switching system arranged in accordance with the invention to allow messaging service subscribers to be notified of newly arrived messages in their mailboxes when they charge expenses associated with a transaction to their credit/debit or calling card number. As used herein, the term "card" refers to any type of credit or debit account mechanism including, but not limited to: a) a commercial credit card, b) a communications-carrier-issued calling card, c) a combined commercial credit card and calling card, and d) a debit card, such as an Automated Teller Machine (ATM) card. A card may be implemented as the well-known rectangular-shaped, embossed plastic material with a magnetic stripe on the back of the card which stores a card number that is readable by a transaction or access control device, such as a card reader. Alternatively, the card may be implemented as an AT&T smart card which is a contactless laminated plastic shell which contains microprocessor chips and a memory that stores the card number and other information in a tamper-resistant manner. As used in this disclosure, the term "transaction" refers to any commercial activity, including an inquiry that requires a card number for the processing of the transaction. Completion of the transaction, (such as a calling card call, charging expenses to a commercial credit card, or cash withdrawal at an Automated Teller Machine) is not required.

The communication switching system of FIG. 1 includes a central office switch 103, an Operator Services Position System (OSPS) 105, a communications carrier network 110, a signaling network 107, a multimedia messaging system 109 and card issuer's validation databases 108 and 118. Central office switch 103 is the point of access for the communication switching system of FIG. 1. As such, it receives call setup signals from public and private telephone sets 101 and 102, respectively, for connection to telephone sets identified by destination numbers included in those call setup signals. Similarly, central office switch 103 receives data connection signals from ATM 104 for access to a computer system, such as transaction database 111. It is worth noting that even though telephone sets 101 and 102 are shown in FIG. 1 as conventional station sets, it is to be understood that those sets may be other communications devices, such as videophones or multimedia station sets.

When a caller at telephone set 102, for example, places a calling card call (destined for telephone set 112 or 113) by dialing "0" followed by a ten-digit telephone number, the call is routed to central office switch 103 which is arranged to recognize the prefix "0" as a request by the caller for an operator-assisted call. Accordingly, central office switch 102 routes the call to an appropriate OSPS based on the destination number dialed by the caller. In this example, the call is routed to OSPS 105 which includes a) a Voice Information System (VIS) 106 which delivers appropriate announcements to calling card callers, b) a communications processor (not shown) which provides semi-automated or fully automated operator-assisted call processing capabilities for handling directory assistance calls and calling card calls, and c) data storage facilities (not shown) containing, for example, the card issuer coordinates table of FIG. 3. Specifically, when OSPS 105 receives the call, VIS 106 emits a signal, such as a "bong" tone to indicate to the caller to enter a card number. OSPS 105 is arranged to conclude that no card number will be provided if the caller has not entered a card number within a predetermined period of time. In that case, OSPS 105 routes the call to an attendant position (not shown) where the call is serviced by an operator.

If the caller enters a card number, then OSPS 105 transmits the card number to a card issuer validation database identified by a card issuer prefix included in the card number. Specifically, OSPS retrieves the table of FIG. 3 to map the prefix of the card issuer to an address that is forwarded to signaling network 107 along with the card number. For example, if the card number entered by the caller has a prefix ranging from 9082 to 9089, then the card number along with the illustrative address njnet! db1 (that is retrieved from the table of FIG. 2, and that is associated with a card issuer validation database) is transmitted to signaling network 107. The latter may be a data network, such as the well-known Signaling System 7 (SS7) network that is comprised of packet switching nodes designed to facilitate exchange of data messages between OSPS 105, validation database 108, multimedia messaging system 107 and communications carrier network 110 according to a pre-defined protocol. In this example, signaling network 107 uses the address received from OSPS 105 to transmit the card number to one of the card issuer's validation databases 108 and 118. Validation databases 108 and 118 are processor-controlled centralized database facilities designed to retrieve pre-stored profiles of card numbers to authorize transactions charged to those card numbers, based on a set of pre-defined parameters.

Figures 2, 3, 4:
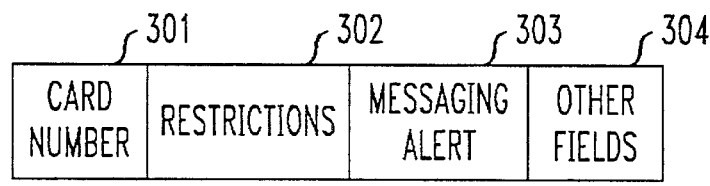
FIG. 2 depicts a table that maps prefixes of card numbers to validation databases addresses.
FIG. 3 shows an illustrative profile for a card number.
FIG. 4 illustrates a table that correlates a database address to a card number.

Upon receiving the card number, validation database 108, for example, uses that card number to retrieve a profile associated with the card number. An illustrative profile for a card number is shown in FIG. 3. The profile of FIG. 3 includes a card number 301, restrictions 302, messaging alert field 303 and other fields 304. Grouped under the label "other fields 304" is information that is used for purposes that are not relevant to this invention. Card number 301 indicates the search key that is used to retrieve the profile illustrated in FIG. 3. Restrictions field 302 defines certain limitations on the use of the card associated with the card number. Of particular significance among the fields in the profile of FIG. 3 is messaging alert field 303 which indicates whether the caller who entered the card number has any new message(s) in his or her mailbox. Messaging alert field 303 may be flag designed to store either a "Y" or "N" alphabetic character indicative of presence or absence, respectively, of a new message in the mailbox. Alternatively, messaging alert field 303 may be a counter indicative of the number of new messages waiting in a mailbox. The messaging alert field 303 is populated or updated based on information received from multimedia messaging system 109.

Multimedia messaging system 109 is a message handling system for receiving and distributing voice, data and video messages in a single medium or multimedia format. Specifically, multimedia messaging system 109 allows users to create, send, receive, retrieve or reply to spoken, written (in ASCII or binary format), graphical and/or image-recorded messages. User interface features that may be provided by multimedia messaging system 109 include, for example, facilities to a) create folders, forms, distribution lists, and b) attach and detach a message or part thereof. Exchange of messages in multimedia messaging system 109 is facilitated by an addressing scheme in which users are assigned a messaging address, such as a mailbox number to which, messages can be directed. Of particular significance is a feature of multimedia messaging service 109 which allows a user to customize his or her mailbox to redirect, incoming messages to a different messaging address or to receive notification of incoming messages in the user's mailbox (as described below) when the user is not accessible at his or her messaging address.

Multimedia messaging system 109 may be a stand-alone, premises-based system comprised of one processor that is often integrated with a customer premises equipment, such as a Private Branch Exchange (PBX). Alternatively, multimedia messaging system 109 may be a network-based system comprised of multiple, interconnected messaging nodes that form a sub-network within communication carrier network 110 for exchange of messages between subscribers. In this example, regardless of the selected implementation (premises-based or network-based), for multimedia messaging system 109, it is arranged to transmit notification signals to transaction database 111 and/or card issuer's validation databases 108 (118).

FIG. 6 illustrates programmed instructions executed by a processing node of multimedia messaging system 109 to transmit a mail arrival notification message to either validation database 108 (118) or transaction database 111. This process is initiated in step 601 when multimedia messaging system 109 receives a message that is destined for a subscriber. The message is forwarded to the subscriber's mailbox or messaging address, as shown in step 602. Thereafter, multimedia messaging system 109 searches the table of FIG. 4 using the card number as a search key to determine whether an alternate notification address is listed for the subscriber, as indicated in step 603. If no alternate notification address is listed for the subscriber, multimedia messaging system 109, in step 604, processes the message in a conventional manner. If an alternate notification address is retrieved in FIG. 4 for the card number associated with the subscriber, then multimedia messaging system 109, in step 506, transmits to the appropriate database(s) an alerting indicia or signal indicative of the arrival of the new message in the mailbox. The alerting indicia or signal, which may be a data message, is delivered by multimedia messaging system 109 to the appropriate database(s) via communications carrier network 110 and/or signaling network 107. Communications carrier network 110 is generally comprised of one or a series of interconnected switching and transmission facilities arranged to route voice, data and multimedia calls to their appropriate destinations. It is worth noting that the alerting indicia or signal may be delivered concurrently to multiple databases. For example, if a subscriber has multiple credit/debit card numbers, such as a calling card number, a credit card number and a debit card number, the alerting indicia or signal may be delivered to the validation databases associated with each one of those card numbers.

FIG. 7 shows an illustrative data message that is transmitted by multimedia messaging system 109 to at least one of the databases 108, 118 and 111. The message of FIG. 7 includes a) a card number 701 that is retrieved from the table of FIG. 4, b) a message identification number 702 that is assigned to each message by multimedia messaging system 109 for the purpose of tracking the message from receipt to distribution, and c) a message source address 703 that allows the receiving database 108 (118) or 111 to provide that information to the subscriber upon request.

Figure 8:
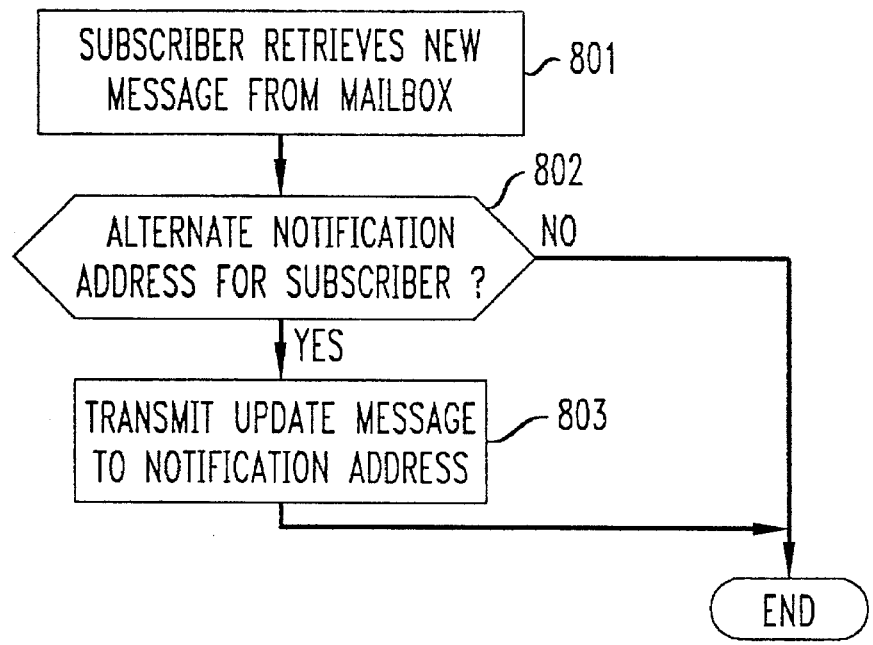
FIGS. 8 and 9 are flowcharts of programmed instructions executed by some of the components of the communications system of FIG. 1 to implement the principles of the invention.

FIG. 8 is a flow diagram of programmed instructions executed by the multimedia messaging system of FIG. 1 to transmit message update notification data to a validation database. This process is initiated in step 801 when a subscriber retrieves a mail message from the subscriber's "fixed mailbox" after multimedia messaging system 109 has notified one or more databases of the arrival of the new message. At the completion of the retrieval operation by the subscriber, multimedia messaging system 109 uses the card number retrieved from FIG. 4 as a search key to determine whether an alternate notification address is listed for the subscriber, as indicated in step 802. If so, multimedia messaging system 109 sends a message to the appropriate database(s) to update messaging alert field 303.

Figure 9:
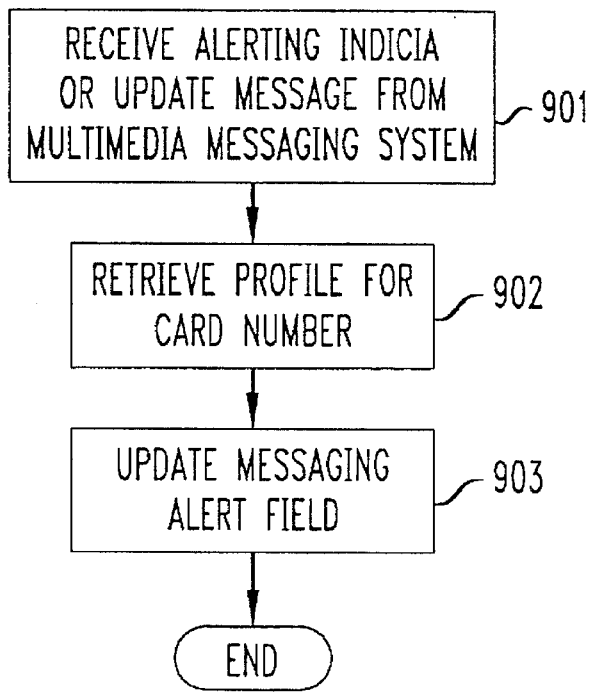

FIG. 9 is a flow diagram of programmed instructions executed by database(s) 108 (118) and/or 111 to update the messaging alert field 303 of FIG. 3. When database(s) 108 (118) and/or 111 receives an alerting indicia or signal or an update message from multimedia messaging system 109, as indicated in step 901, the database retrieves the profile associated with the card number 601, as shown in step 902. Thereafter, the database updates the messaging alert field, as indicated in step 903. Specifically, when messaging alert field 303 is a flag, the database updates that field by replacing its content with either a "Y" when the received message is an alerting indicia or signal, or an "N" when the received message is an update message. When messaging alert field 303 is a counter, it is updated by either incrementing the counter for a received alerting indicia, or by decrementing the counter for a received update message.

Hence, when a caller places a calling card call, the card issuer validation database receives the calling card number, as described above. If the profile for that card number indicates—as reflected by the content of the messaging alert field—that one or more new messages have been received in the caller's mailbox, then the card issuer validation database sends a signal to VIS 105 to play an announcement to notify the caller of the arrival of the new message(s) in his or her mailbox. The announcement may be transmitted to the caller, for example, after the card number has been validated. The announcement may be preceded by an audible logo message identifying the carrier completing the call. An illustrative such announcement may be "Thank you for using AT&T, by the way you have two new messages in your mailbox."

Alternatively, card issuer's validation database 108 (118) may, upon receiving the card number, query multimedia messaging system 109 to determine whether any new message(s) has been received in the subscriber's mailbox. In that case, card issuer's validation database 108 (118) will send a message (which includes the card number) to multimedia messaging system 109. The latter, upon receiving the card number, maps the card number to a messaging address, using the table of FIG. 5 to determine whether any new message(s) has been received for that address. If so, multimedia messaging system 109 transmits to validation database 108 (118) a signal indicative of the presence of a new message in the subscriber's mailbox. Otherwise, multimedia messaging system 109 sends a "No New Mail" message to card's issuer validation database 108 (118).

According to another aspect of the invention, when a messaging service subscriber initiates an ATM transaction at ATM 104 by swiping a debit card into the card reader of ATM 104 and providing a password, the debit card number and the subscriber's password are forwarded to transaction database 111 via central office switch 104 and communications carrier network 110. Upon receiving that information, transaction database 111 checks the messaging alert field 303 to determine whether any new message(s) has arrived in the subscriber's mailbox. As was the case for card issuer's validation database 108 (118), transaction database 111 may alternatively query multimedia messaging system 109 to determine whether any new (message(s) was received for the subscriber who initiated the transaction. If so, a message is displayed on the display monitor of ATM 104 to notify the subscriber of the new message arrival.

The foregoing is to be construed as only being an illustrative embodiment of this invention. Persons skilled in the art can easily conceive of alternative arrangements providing functionality similar to this embodiment without any deviation from the fundamental principles or the scope of this invention.

I claim:

1. A method of notifying a messaging service subscriber of messages in the subscriber's mailbox, the method comprising the steps of:

receiving a card number from the messaging service subscriber who is using said card number for a purpose other than accessing a messaging system;

associating the card number with the messaging system regarding the presence of the messages for the messaging service subscriber; and responsive to the associating step, outputting an alert message notifying the messaging service subscriber of said messages.

2. The method of claim 1 wherein said outputting step further comprises the step of:

delivering the alert message to inform the messaging service subscriber of receipt of at least one new message in the messaging service subscriber's mailbox.

3. The method of claim 1 wherein said outputting step further comprises the step of:

delivering the alert message to inform the messaging service subscriber that no new message has been received in the messaging service subscriber's mailbox.

4. The method of claim 1 wherein said associating step further includes the step of:

querying said messaging system to receive information regarding the presence of said messages.

5. The method of claim 1 wherein said card number is received as part of the processing of a calling card telephone call and wherein said outputting step further comprises the step of:

delivering the alert message in audible form.

6. The method of claim 1 wherein said associating step further comprises the step of:

retrieving from a database at which said card number was received, a profile associated with the card number, said profile storing information regarding presence of messages for said subscriber associated with the card number, said information having been transferred to said database by a messaging system serving the subscriber.

7. The method of claim 1 wherein said outputting step further comprises the step of:

delivering the alert message only if at least one message is waiting in said subscriber's mailbox.

8. The method of claim 1 wherein said outputting step further comprises the step of:

displaying the alert message on a monitor connected to an input device from which the card number originated.

9. A method of notifying a messaging service user of a new message in the user's mailbox, the method comprising the steps of:

receiving at a messaging system at least one new message for a messaging service user's mailbox;

identifying a card number associated with the messaging service user's mailbox;

including in a profile of the identified card number information indicative of the at least one new message in the user's mailbox; and alerting the messaging service user of the at least one new message in the user's mailbox when the user makes use of the card number for a purpose other than accessing the messaging system.

10. The method of claim 9 wherein the at least one new message includes an electronic mail message.

11. The method of claim 9 wherein the at least one new message includes a voice mail message.

12. The method of claim 9 wherein the at least one new message includes a multimedia mail message.

13. A method of delivering message arrival notification to a user, the method comprising the steps of receiving at a messaging system at least one new message destined for a user's messaging address;

mapping the user's messaging address to a card number;

sending to a database of an issuer of the card number information indicative of the reception of the at least one new message;

in response to receiving at the database the card number as part of a query to validate the card number for a purpose other than accessing the messaging system, notifying the user of the reception of the at least one new message at the user's messaging address.

14. The method of claim 13 wherein said purpose is a telephone call and wherein said notifying step comprises the step of delivering in audible form a message which a) identifies a communications carrier completing the call, and b) indicates the reception of the at least one new message.

15. A messaging system comprising at least one node which receives at least one new message destined for a user's messaging address;

a table that correlates the user's messaging address to a card number; and means, responsive to the reception of the at least one new message, for sending to a validation database associated with the card number, information indicative of the reception of the at least one new message to permit said user to be notified of the reception of the at least one new message when the user makes use of the card number for a transaction other than accessing the messaging system.

16. A system for alerting a messaging service subscriber of messages in the subscriber's mailbox, the system comprising a database which receives data associated with a transaction initiated by the messaging service user, said data including a card number for processing the transaction other than accessing a messaging system;

means for retrieving from a profile that is stored in the database and that is associated with the card number information regarding presence of messages in the user's mailbox, said information having been transferred to said profile by the messaging system serving the subscriber; and means for outputting an alert message informing the messaging service user of said messages in the user's mailbox.

17. The system of claim 16 wherein said retrieving means further includes means for querying said messaging system to receive information regarding the messages in the subscriber's mailbox.

18. The system of claim 16 wherein said transaction is a telephone call and wherein said outputting means further comprises:
means for delivering the alert message in audible form.

19. The system of claim 16 wherein said outputting step further comprises
means for delivering the alert message only if the transaction is authorized.

20. A system for notifying a messaging service user of a new message in the user's mailbox, the system comprising:
means for receiving at a messaging system at least one new message destined for a messaging service user's mailbox address;
a table that correlates the messaging service user's mailbox address to a card number;
means for including in a profile of the card number information indicative of the reception of the at least one new message at said user's mailbox address; and
means for alerting the messaging service user of the reception of the at least one new message said user's mailbox address when the user makes use of the card number for a transaction other than accessing the messaging system.

21. The system of claim 20 wherein the at least one new message includes an electronic mail message.

22. The system of claim 20 wherein the at least one new message includes a voice mail message.

23. The system of claim 20 wherein the at least one new message includes a multimedia mail message.

24. Apparatus for use with a messaging system, said apparatus comprising:
a table that stores data correlating a card number to a messaging address of a subscriber; and
means, responsive to receiving at said messaging system at least one new message destined for said subscriber's messaging address, for storing in a profile for said card number information indicative of the reception of the at least one new message so that the subscriber can be notified of the reception of the at least one message when the profile is retrieved to validate the card number for a transaction other than accessing the messaging system.

25. A method of processing a non-messaging-related transaction that is initiated by a messaging service user, said method comprising
accessing a database to retrieve data needed in connection with said transaction;
retrieving from said database alerting indicia indicative of presence of at least one message in said messaging service user's mailbox, said alerting indicia having been transferred to said database by a messaging system serving said user; and
notifying said user of the presence of said at least one new message in said mailbox as data associated with the transaction is transmitted to said messaging service user.

26. The method of claim 25 further comprising the step of:
providing to said messaging system an address of said database for the transfer of said alerting indicia from said messaging system to said database.

* * * * *